(12) United States Patent
Chiu

(10) Patent No.: US 7,268,686 B2
(45) Date of Patent: Sep. 11, 2007

(54) RFID RADIATION NULLIFIER

(75) Inventor: Lihu M. Chiu, Arcadia, CA (US)

(73) Assignee: Printronix, Inc., Irvine, CA (US)

( * ) Notice: Subject to any disclaimer, the term of this patent is extended or adjusted under 35 U.S.C. 154(b) by 224 days.

(21) Appl. No.: 11/072,838

(22) Filed: Mar. 4, 2005

(65) Prior Publication Data

US 2006/0208895 A1    Sep. 21, 2006

(51) Int. Cl.
 *G08B 13/14* (2006.01)
(52) U.S. Cl. .............. 340/572.3; 340/572.7; 340/10.51; 235/451
(58) Field of Classification Search .......... 340/572.7, 340/10.51, 572.3; 235/451
 See application file for complete search history.

(56) References Cited

U.S. PATENT DOCUMENTS 5,565,858 A * 10/1996 Guthrie ............... 340/10.33
5,955,969 A * 9/1999 D'Hont ................ 340/928
6,392,544 B1 * 5/2002 Collins et al. ........... 340/572.7
6,611,199 B1 * 8/2003 Geiszler et al. ......... 340/10.51
6,837,427 B2 * 1/2005 Overhultz et al. ......... 235/382
7,075,436 B2 * 7/2006 Shanks et al. ........... 340/572.1
7,088,248 B2 * 8/2006 Forster ................ 340/572.7
2005/0280504 A1 * 12/2005 Pettus .................. 340/10.1
2007/0046435 A1 * 3/2007 Fratti et al. ............ 340/10.2

* cited by examiner

*Primary Examiner*—Jeffery Hofsass
*Assistant Examiner*—Anne V. Lai
(74) *Attorney, Agent, or Firm*—Jonathan W. Hallman; MacPherson Kwok Chen & Heid LLP

(57) ABSTRACT

In one embodiment, a system for communicating with an RFID tag is provided that includes: a capacitive encoder adapted for placement in proximity of the RFID tag and operable to transmit a first operating signal to the RFID tag for communicating with the RFID tag; wherein the capacitive encoder is further operable to transmit to the RFID tag a second operating signal adapted to excite the RFID tag such that RF radiations from the RFID tag to adjacent RFID tags are nullified.

14 Claims, 8 Drawing Sheets

RFID RADIATION NULLIFIER

RELATED APPLICATIONS

This application is related to U.S. patent application Ser. No. 11/073,042, filed Mar. 4, 2005 and application Ser. No. 11/072,060, filed Mar. 4, 2005, the contents of both applications being hereby incorporated by reference in their entirety.

FIELD OF THE INVENTION

This invention relates to RFID applications. More particularly, the present invention is directed to radiations emitted by RFID tags.

BACKGROUND OF THE INVENTION

Radio Frequency Identification (RFID) systems represent the next step in automatic identification techniques started by the familiar bar code schemes. Whereas bar code systems require line-of-sight (LOS) contact between a scanner and the bar code being identified, RFID techniques do not require LOS contact. This is a critical distinction because bar code systems often need manual intervention to ensure LOS contact between a bar code label and the bar code scanner. In sharp contrast, RFID systems eliminate the need for manual alignment between an RFID tag and an RFID reader or interrogator, thereby keeping labor costs at a minimum. In addition, bar code labels can become soiled in transit, rendering them unreadable. Because RFID tags are read using RF transmissions instead of optical transmissions, such soiling need not render RFID tags unreadable. Moreover, RFID tags may be written to in write-once or write-many fashions whereas once a bar code label has been printed further modifications are impossible. These advantages of RFID systems have resulted in the rapid growth of this technology despite the higher costs of RFID tags as compared to a printed bar code label.

Although RFID systems offer certain advantages over a traditional bar code schemes their use is also not without concerns. One such concern is radiations, such as electric signal, emitted by RFID tags when made operational. Generally, in a RFID system, an RFID tag includes a transponder and a tag antenna, and communicates with an RFID transceiver pursuant to the receipt of a signal, such as interrogation or encoding signal, from the RFID transceiver. The signal causes the RFID transponder to emit via the tag antenna a signal, such as an identification or encoding verification signal, that is received by the RFID transceiver. In passive RFID systems, the RFID tag has no power source of its own and therefore the interrogation signal from the RFID transceiver also provides operating power to the RFID tag.

A concern in the foregoing approach is when numerous RFID tags are within range of each other while a signal is transmitted from a transceiver to one of the RFID tags, and which becomes particularly acute during the initial encoding of the RFID tags, where an often large number of RFID tags are juxtaposed in an assembly line fashion during manufacturing. In this setting, the encoding signal from a transceiver to an intended recipient transponder can cause the intended transponder to generate electric fields, such as dipole field, which in turn would excite the tag antenna in the intended RFID tag to transmit encoding and operating radiations to adjacent RFID tags. The adjacent RFID tags will then in turn become operational and encoded with the information intended for the recipient transponder, thus detrimentally overwriting the adjacent tags previous encoding. This results in one or more adjacent RFID tags having the same identification information as the intended RFID tag, and thus become distinguishable from each other during future use. In addition, the information encoded on the intended recipient transponder will also be overwritten in the same manner once the transceiver begins encoding of the next adjacent RFID tag.

As the size of the RFID tags continue to decrease due to technological advancement in the field, the number of adjacent RFID tags that are within range of the intended RFID tag in an assembly line increases, thus further exacerbating the above-described problem. In addition, the operating power required to encode RFID tags is also decreasing, such as down to 10 micro-Watts from 110 micro-Watts, thus making each RFID tag more susceptible to operating radiations received from adjacent RFID tags and thus becoming encoded with information intended for an adjacent RFID tag.

Accordingly, there is a need in the art for nullifying the unwanted operating radiations transmitted from an intended RFID tag to adjacent RFID tags.

SUMMARY OF THE INVENTION

In accordance with an aspect of the invention, a system for communicating with an RFID tag is provided that includes: a capacitive encoder adapted for placement in proximity of the RFID tag and operable to transmit a first operating signal to the RFID tag for communicating with the RFID tag; wherein the capacitive encoder is further operable to transmit to the RFID tag a second operating signal adapted to excite the RFID tag such that RF radiations from the RFID tag to adjacent RFID tags are nullified.

In accordance with another aspect of the invention, a method for communicating with an RFID tag is provided that includes the acts of: placing a capacitive encoder in proximity of the RFID tag; transmitting a first operating signal from the capacitive encoder to the RFID tag for communicating with the RFID tag; and during the transmission of the first operating signal, transmitting to the RFID tag a second operating signal from the capacitive encoder such that RF transmission from the RFID tag to adjacent RFID tags is nullified.

DETAILED DESCRIPTION OF THE INVENTION

Figure 1:
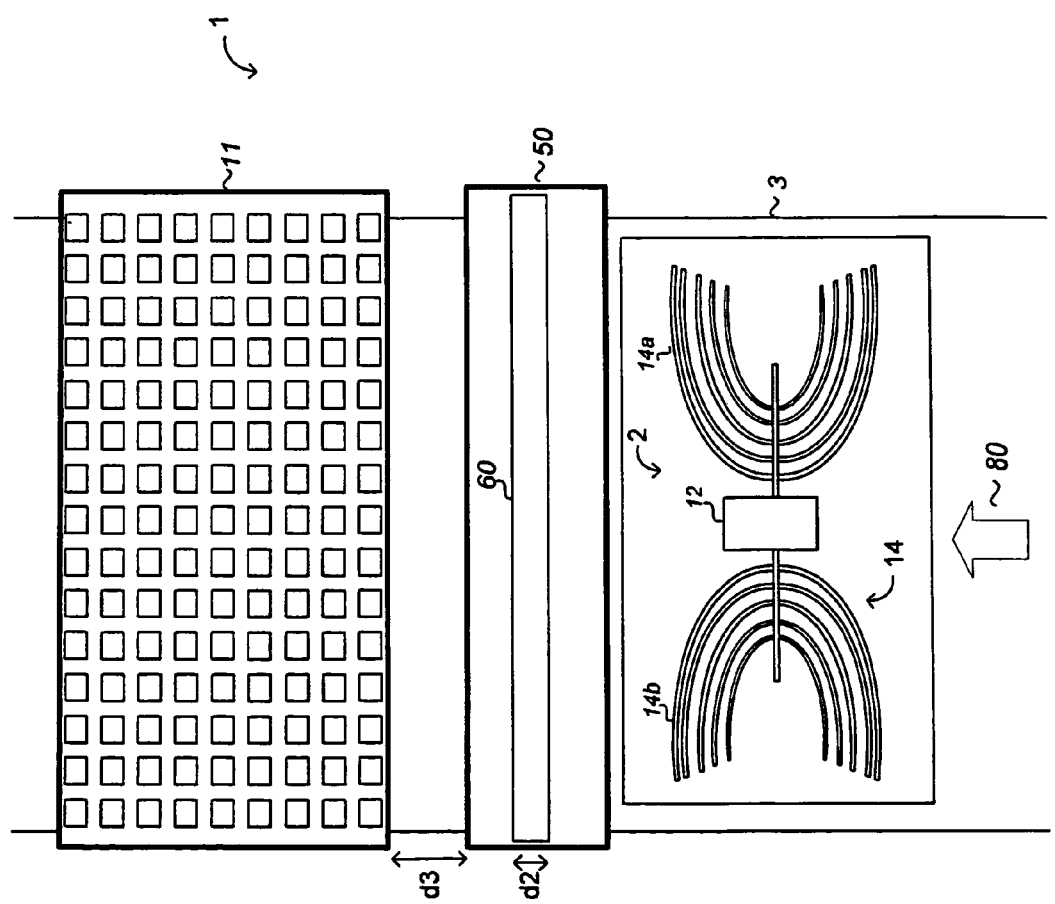
FIG. 1 illustrates an exemplary system including an imager and a capacitive encoder for communication with an RFID tag in accordance with an embodiment of the invention.

With reference to FIG. 1, an exemplary system 1 is shown that includes an RFID tag-imager subsystem 50 and a capacitive encoder 11. As known in the art, RFID tags such as an RFID tag 2 are typically provided on a roll 3. Roll 3 includes a backing such as paper or plastic on which the RFID tags are temporarily affixed using tape or similar means. System 1 may be integrated with a bar code printer (not illustrated) such that as goods are processed, system 1 encodes an RFID tag 2 from the roll, affixes the RFID tag 2 to the package, and also prints a corresponding bar code label for the package. As additional packages or goods are processed, additional RFID lags (not shown) are fed to system 1 from the roll in direction 80.

Figure 2A:
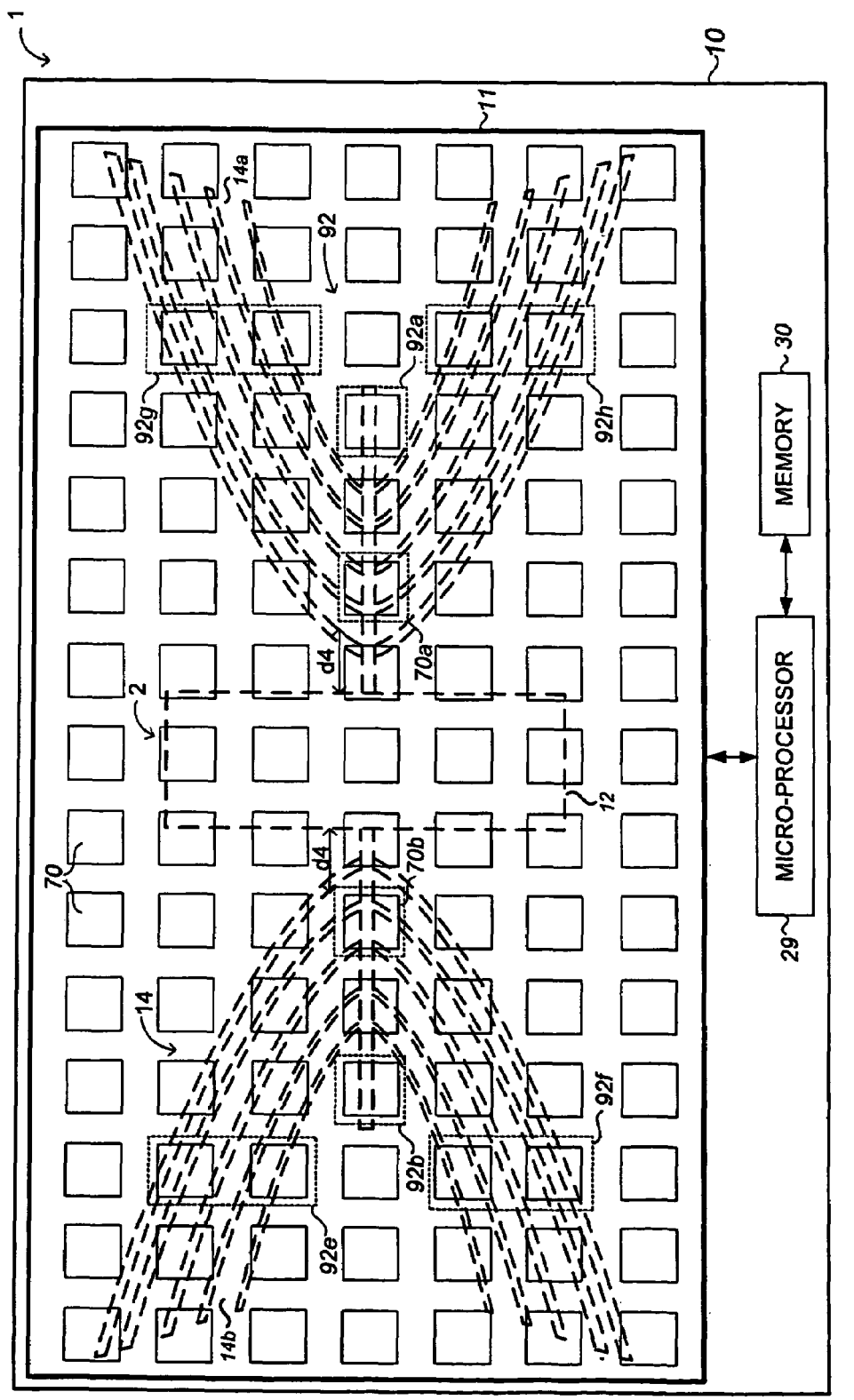
FIGS. 2A-B illustrate the capacitive encoder of FIG. 1 encoding an RFID tag in accordance with embodiments of the invention.

RFID tag 2 includes a transponder 12 and a tag antenna 14 such as a patch antenna or a dipole antenna. In the exemplary embodiment shown in FIG. 1, tag antenna 14 is a dipole antenna having antenna wings 14a and 14b. As will be described further herein with respect to FIG. 2A and FIG. 2B, capacitive encoder 11 includes a plurality of elements such as conductive plates 70 that may be selectively excited so as to encode RFID tag 2. In FIG. 2A, the RFID tag 2 (shown in phantom) has been moved adjacent to capacitive encoder 11 such that if plates 70a and 70b are excited with a signal within the operating bandwidth of the RFID-tag 2, the RFID tag 2 may be encoded (or alternatively, may be read). The selection of which plates 70 within the array that should encode the RFID tag 2, however, depends upon the topology of the tag antenna 14. Advantageously, system 1 needs no prior knowledge of the antenna topology. In that regard, an operator of system 1 need not be concerned with configuring system 1 responsive to the particular RFID tag being encoded.

To determine which plates 70 should be selected for excitation, system 1 may first image the tag antenna 14 using imager subsystem 50. For example, imager subsystem 50 may image tag antenna 14 in successive portions 60 of width $d_2$ as shown in FIG. 1. In that regard, roll 3 upon which the RFID tag 2 is mounted could be drawn through system 1 at either a constant or changing rate. As the RFID tag 2 passes by imager subsystem 50, the data from the successive portions being imaged are captured and processed by a microprocessor 29 shown in FIG. 2A. Microprocessor 29 processes the resulting data to form a complete image of the tag antenna 14. Based upon this image, microprocessor 29 may then run an electromagnetic modeling algorithm such as a finite element analysis/method of moments algorithm to determine the areas of greatest surface currents within antenna 14 in response to an excitation. For example, with respect to dipole wings 14a and 14b, an area of maximum current excitation would be similarly located within each dipole half. Capacitive encoder 11 may then excite at least one capacitive plate 70 corresponding to each area of maximum current excitation. For example, with respect to dipole half 14b, capacitive plate 70b may be considered to be most closely positioned with the area of maximum current excitation. Similarly, capacitive plate 70a may be considered to be most closely positioned with the area of maximum current excitation in dipole half 14a. The determination of when to excite plates 70a and 70b will depend upon the rate of progress for the RFID tag 2 with respect to system 1 as well as the distance $d_3$ between imager subsystem 50 and capacitive encoder 11. It will be appreciated that the selection of a single plate for each dipole half is for illustration purposes only—depending upon the antenna topology, more than one plate 70 for each area of maximum current excitation may be necessary.

Figure 2B:
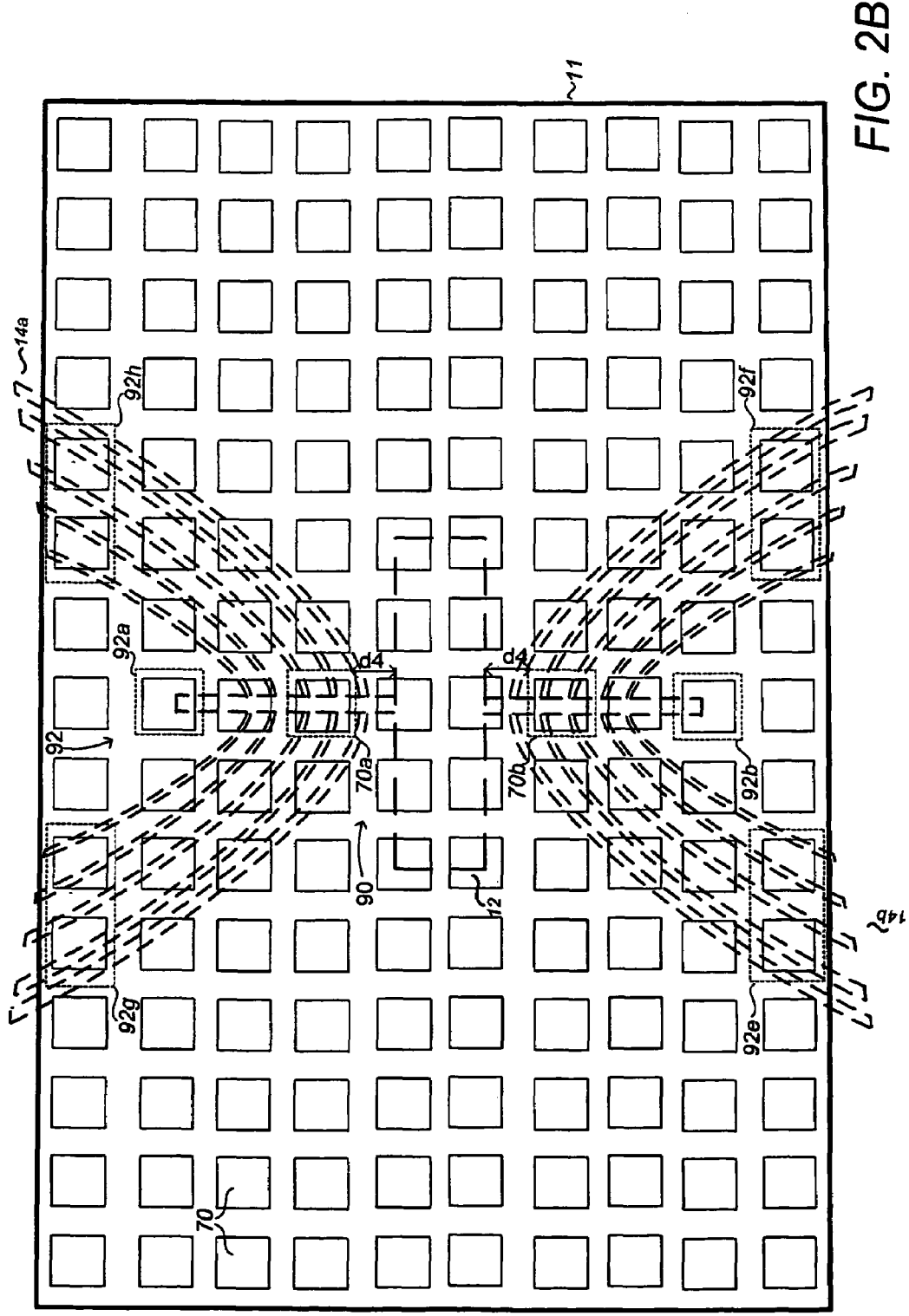

Consider the advantages of system 1: Regardless of the orientation and topology of the tag antenna 14, system 1 may image the tag antenna 14, model its electromagnetic properties based upon the imaging to determine maximum current excitation areas, and select plates 70 accordingly to properly encode the RFID tag 2. Thus, should the RFID tag 2 be oriented differently such as being rotated approximately 90 degrees as shown in FIG. 2B, capacitive encoder 11 may still make a proper selection of a subset of plates 70 for encoding of the RFID tag 2. Thus, based upon data from imager subsystem 50, processor 29 will select plates 70a and 70b as discussed with respect to FIG. 2A. As seen in FIG. 2B, however, the locations of plates 70a and 70b have changed corresponding to the new orientation of the tag antenna 14.

In another exemplary embodiment, imager subsystem 50 may include an optics subsystem (not shown) comprising a light source, such as a lamp, to illuminate the RFID tag 2 with illuminating radiations in the visible spectrum, such as visible light, and optical lens for receiving the reflected visible light from the RFID tag 2.

Because of the electromagnetic modeling performed by processor 29, capacitive encoder 11 may perform other operations on the RFID tag 2 besides either encoding or interrogating. For example, based upon modeling the currents excited in the tag antenna 14, processor 29 may determine the radiated fields from the tag antenna 14 that would be excited by the encoding or interrogating signals driven to plates 70a and 70b. Because the RFID tags may be affixed to roll 3 as discussed previously, the radiation from one RFID tag may affect adjacent RFID tags. As the sensitivity of RFID tags is increased, the received radiation in the adjacent tags may be such that these tags are also encoded by capacitive encoder 11. To prevent such stray radiation and undesired encoding of adjacent RFID tags, processor 29 may select subsets 92 of plates 70 to be excited with a signal that will nullify any radiation from the encoded RFID tag 2. For example, with respect to dipole half 14a, a subset 92a consisting of just one plate may be selected to be driven with a nullifying signal. Alternatively, depending upon the desired nullifying effect, subsets 92g or 92h may be selected. Similarly, with respect to dipole half 14b, subsets 92b, 92e, and 92f represent exemplary plate selections for a nullifying signal excitation.

In embodiments in which capacitive encoder 11 not only encodes or interrogates but also nullifies electromagnetic radiation from the excited RFID tag 2, a total of four signals should be available to drive any given plate 70. For example, suppose a plate 70 is selected for the encoding signal. Depending upon which dipole half the selected plate 70 corresponds to, the plate may be driven with a signal within the operating bandwidth of RFID tag 2. For example, with respect to FIG. 2B, plate 70a could be driven with this signal whereas plate 70b may be driven with the same signal shifted in phase by 180 degrees. These two signals may be denoted as A and A*.

In general, signals A and A* need merely be out of phase by some appreciable amount. For example, it may readily be seen that if signals A and A* are completely in phase, no excitation of RFID tag 2 will ensue. As A* is shifted out of phase with respect to A, a greater and greater amount of excitation may ensue. For example, if A* is shifted in phase by 135 degrees with respect to A, the excitation power will be approximately 70 percent of the maximum achievable power, which corresponds to a phase shift of 180 degrees.

Figure 3:
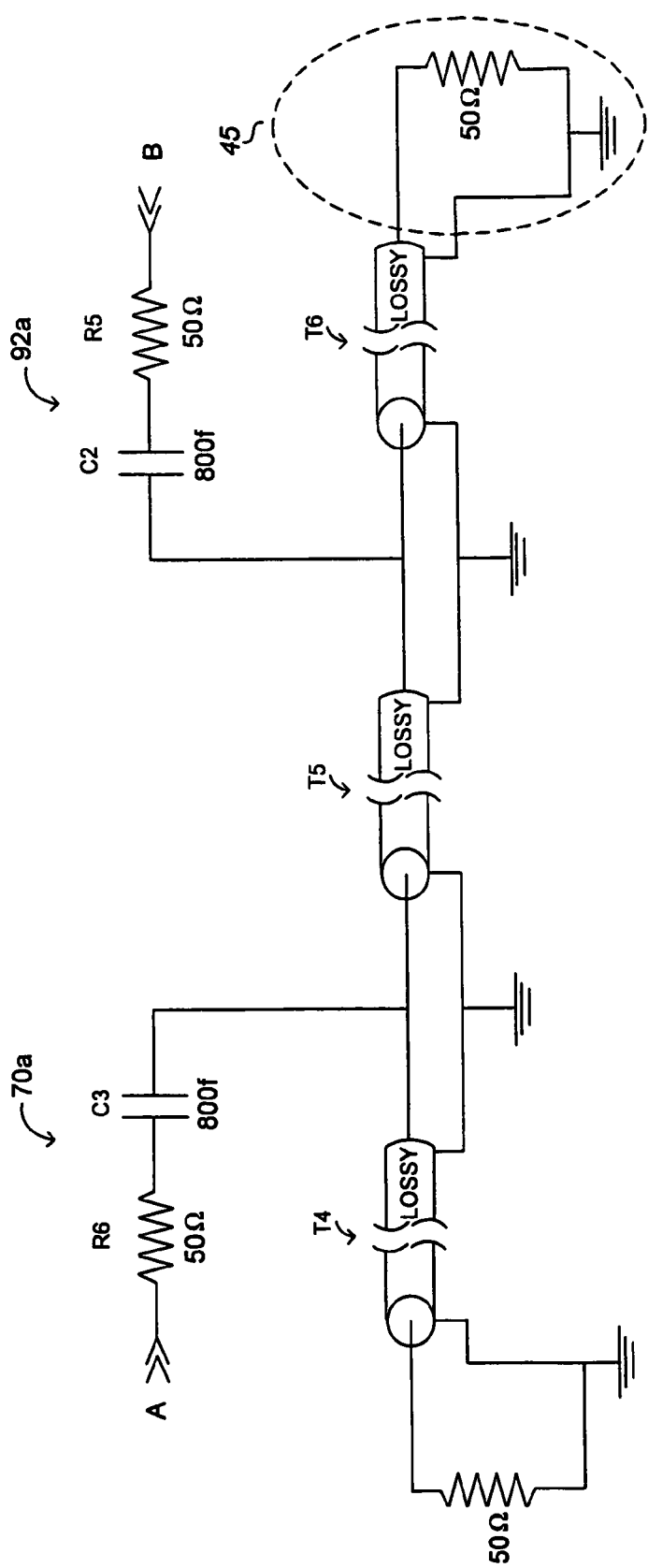
FIG. 3 is a schematic illustration of a simplified electromagnetic model for an RFID tag antenna, wherein the antenna is excited with both an encoding signal A and a nullifying signal B.

Regardless of the phase relationship between signals A and A*, processor 29 may calculate a nullifying signal that will have some phase and power relationship to signal A. This nullifying signal may be represented as signal B. For example, suppose that after imaging and electromagnetic modeling of RFID tag antenna 14, processor 29 simplifies the resulting electromagnetic model as seen in FIG. 3. In this model, the electrical properties of the tag antenna 14 are represented by lossy transmission line portions T4, T5, and T6. These lines would have some characteristic impedance that would depend upon the electrical-properties of the tag antenna 14. The input to T4 would be the excitation point from transponder 12 (FIG. 1). The output of T6 represents the field at the "end" of the tag antenna half 14*a*. The actual location of the end of T6 depends upon the RFID tag orientation on roll 3. For example, as seen in FIG. 2A, the RFID tags may be orientated in a side-to-side fashion whereas as seen in FIG. 2B, the RFID tags may be oriented in an end-to-end fashion. It will be appreciated that the field between adjacent RFID tags is the field of primary concern. Thus, the end of T6 represents the location of this field.

Regardless of whether the orientation is of the RFID tag 2 is side-to-side, end-to-end, or some other arrangement, the electrical model shown in FIG. 3 may be used to represent the radiation between adjacent RFID tags. In this model, the capacitive plates 70 are also modeled. Plate 70*a* is represented by resistor R6 and, capacitor C3. Similarly, plate 92*a* is represented by resistor R5 and capacitor C2. Based upon this electromagnetic model, the relationship between nullifying signal B and encoding signal A may be derived such that no fields are excited in region 45, at the end of transmission line T6. Analogous calculations may be performed to derive a nullifying signal B* for encoding signal A*. A bus structure to support the feed and selection of signals A, A*, B, and B* to each capacitive plate will now be discussed.

Figure 4A:
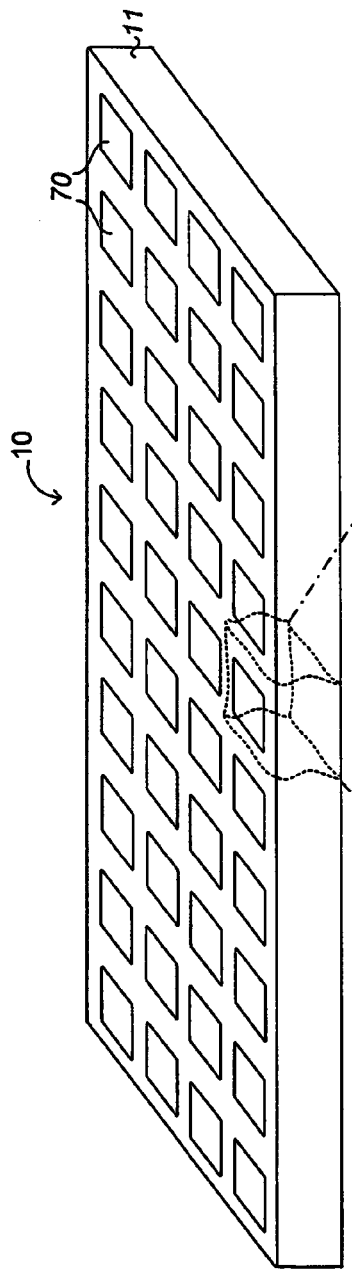
FIG. 4A. is a perspective view of the capacitive encoder of FIGS. 2A and 2B.
Figure 4B:
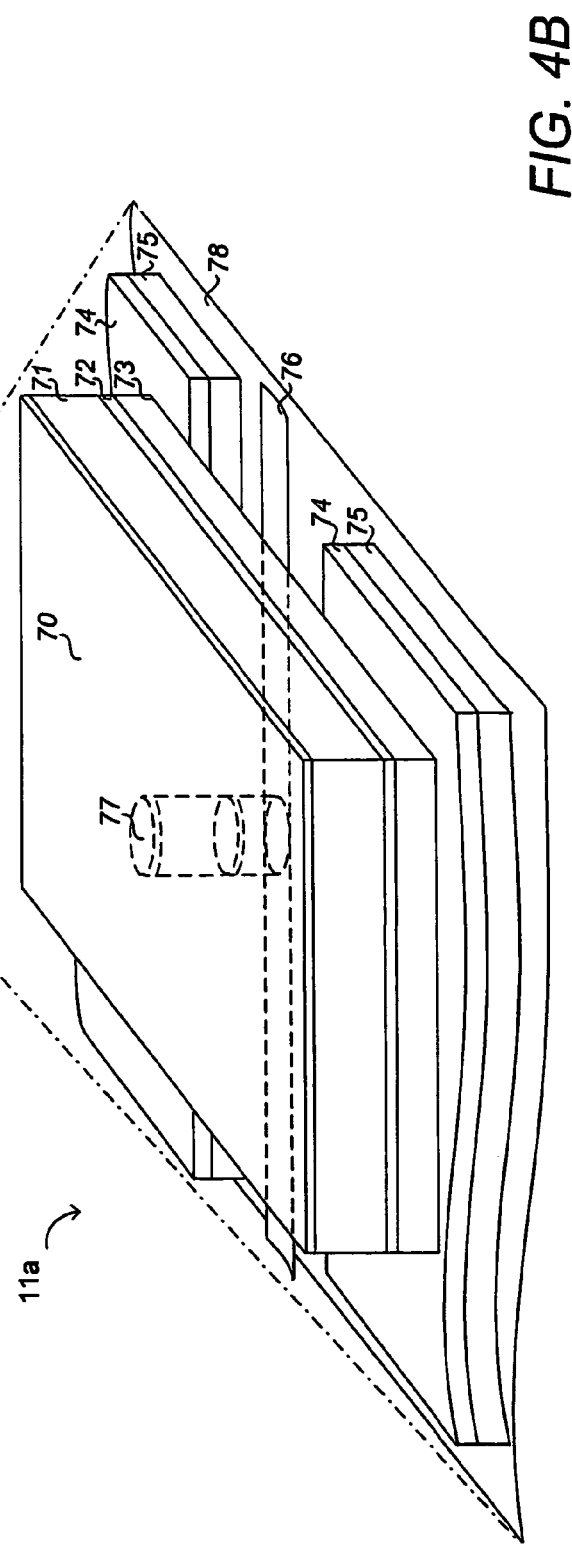
FIG. 4B is a cross-sectional view of a portion of the capacitive encoder of FIG. 4A.

Turning now to FIG. 4A and FIG. 4B, a capacitive encoder 11 is illustrated to demonstrate an exemplary embodiment that supports the selection of signals A through B* for a particular capacitive plate. Each conductive/capacitive plate 70 is formed on a dielectric layer 71. To shield plates 70 from a driving network (discussed further with respect to FIG. 5), dielectric layer 71 overlays a ground shield 72. Ground shield 72 is separated from a feed plane 78 supporting the driving network. For example, the network may be formed using planar waveguides. For illustration clarity, only one waveguide 76 is illustrated. In a row/column arrangement of plates 70 such as shown in FIG. 4A, each row and/or column may be associated with a corresponding row or column waveguide 76. In one embodiment, the row and column waveguides may intersect and thus lie on the same plane. To carry the four signals A through B*, a separate feed plane would carry another row and column waveguide formation. Alternatively, different feed plane layers 78 may be used for each signal. Coupling between adjacent waveguides may be minimized through the incorporation of ground shields 74 in the feed plane 78 as supported by dielectric layers 75 and 73. To couple signals in waveguide 76 to plate 70, via feed contact 77 (shown in phantom) may be formed in the intervening layers.

Figure 5:
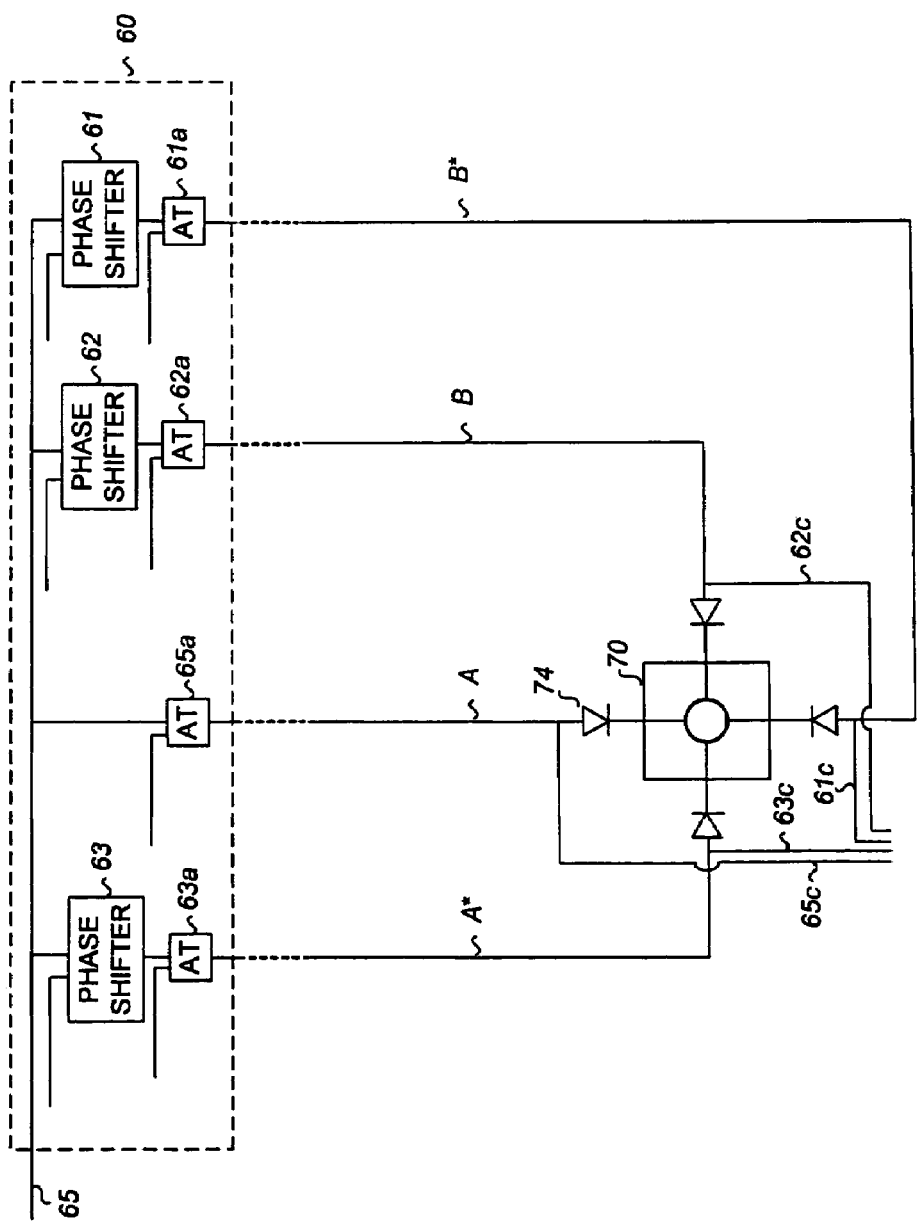
FIG. 5 is a schematic illustration of the driving network supported within the capacitive encoder of FIGS. 4A-B.

Turning now to FIG. 5, further aspects of the driving network are illustrated. As discussed previously, each plate 70 may be driven with one of four available signals. To generate these signals, capacitive encoder 11 may include a programmable phase shifter subsystem 60, such as one comprising 5-bit phase shifters 61, 62 and 63 coupled to programmable attenuators 61*a*, 62*a* and 63*a*, respectively, and adapted to receive an operating signal 65. Operating signal 65 may be programmably attenuated in attenuator 65*a* to form the driving signal A as discussed previously. To generate the driving signal A* that is 180 degrees out of phase with respect to signal A, the operating signal 65 may be phase-shifted by phase-shifter 63 and programmably attenuated by attenuator 63*a*. Similarly, operating signal 65 may be programmably phase-shifted in phase-shifters 62 and 61 and then programmably attenuated in attenuators 62*a* and 61*a* to form nullifying signals B and B*. Signals A, A*, B, and B* may be coupled through conductors such as waveguide 76 to a selected plate's 70 via feed contact 77. For example, to select a plate 70, a corresponding switch such as a diode 74 may be driven into a conductive state.

As also shown in FIG. 5, the operating signal 65 is phase-shifted by phase-shifter 62 into a signal B that is 180 degree out of phase with respect to the attenuated operating signal A, for maximizing signal throughput during encoding and communicating, as described above. In addition, operating signal 65 is also inputted into phase shifters 61, and 63 for phase-shifting by a predetermined phase angle into signals B* and A*, respectively. In another exemplary embodiment, the programmable grid antenna subsystem is operable to receive an inputted phase, such as a predetermined phase inputted by a user.

Figure 6:
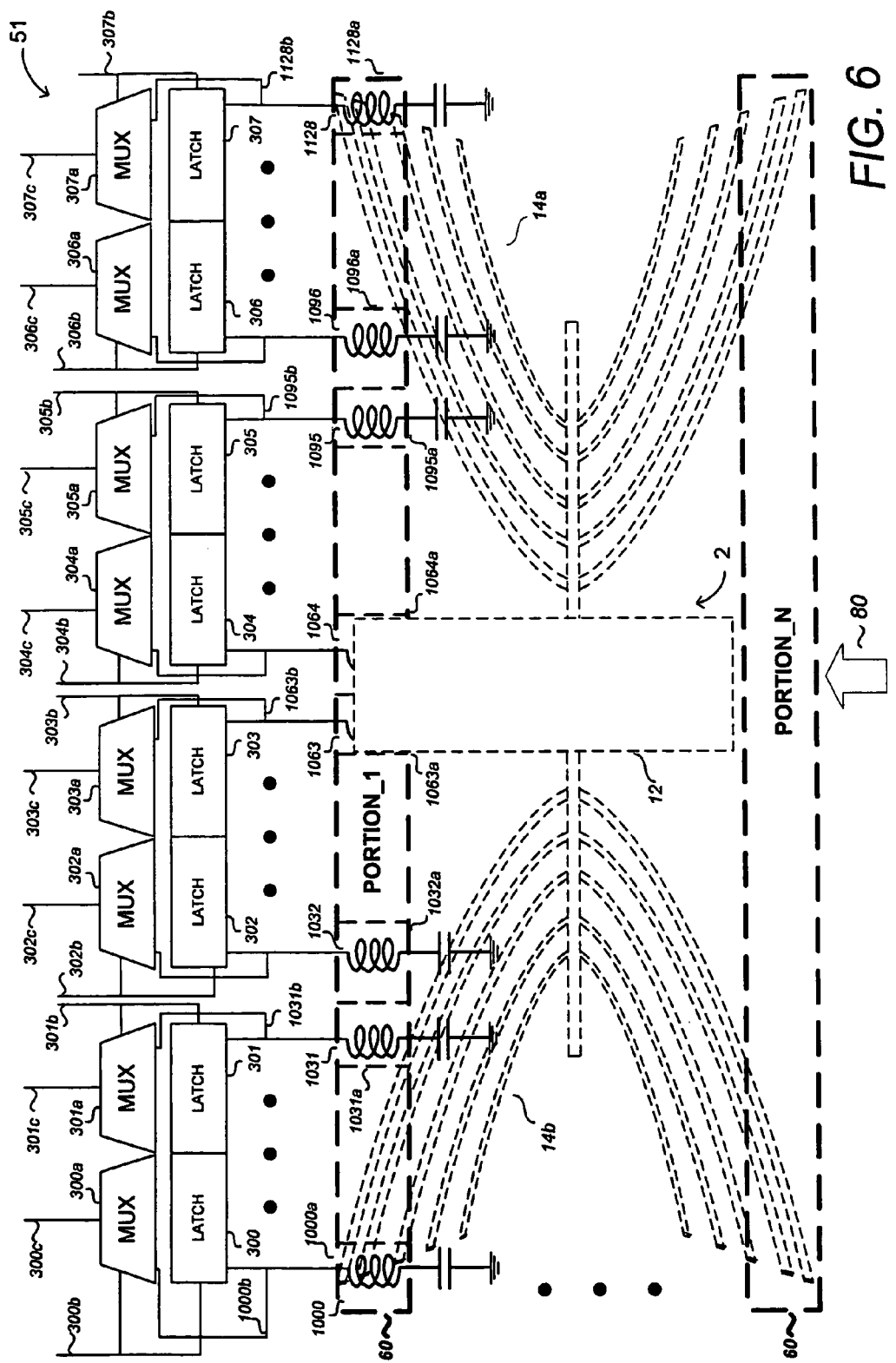
FIG. 6 is a schematic illustration of an RFID tag imager in accordance with an embodiment of the invention.

As discussed previously, the phase and amplitude relationship of nullifying signals B and B* to corresponding encoding signals A and A* depends upon the electromagnetic modeling which in turn depends upon the imaging provided by imager subsystem 50. Imager subsystem 50 may be constructed using either an optical or inductive sensors. An inductive embodiment of imager subsystem 50 is illustrated in FIG. 6. As shown in FIG. 6, the inductor array subsystem 51 comprises an exemplary array of 128 inductors, such as inductors 1000-1128 juxtaposed in a linear formation. In that regard, each inductor corresponds to a pixel of the portion 60 being imaged as discussed with respect to FIG. 1. It will thus be appreciated that the dimensions of inductors 128 determine the pixel size and hence the resolution of the resulting image. The necessary resolution in turn depends upon the conductor width and layout complexity of the tag antenna 14. In one embodiment, the pixel size is approximately 0.3 mm. Each of inductors 1000-1128 is operable to generate a corresponding induction field, such as induction fields 1000*a*-1128*a* corresponding to inductors 1000-1128, respectively. For simplicity, only a subset of the inductors 1000-1128 and their corresponding induction fields 1000*a*-1128*a* are shown in FIG. 6. As shown in FIG. 6, an RFID tag 2 (shown in phantom) is placed in proximity of the imager subsystem 50, such as under the imager subsystem 50. The presence of each metallic part in the RFID tag 2 is then "felt" by each inductor via a change in a frequency pattern of the affected inductor, such as inductor 1000 whose induction field 1000*a* is affected by a metallic part of antenna wing 14*b*. A signal representing the change in the frequency pattern of an affected inductor, such as inductor 1000, is then transmitted from the affected inductor via one of the transmission lines 1000*b*-1128*b* corresponding to the inductors 1000-1128, respectively, such as via transmission line 1000*b* corresponding to inductor 1000.

In an exemplary embodiment of the present invention, to reduce a detrimental overlapping of induction fields of adjacent inductors, such as overlapping of induction fields 1031a and 1032a of adjacent inductors 1031 and 1032, inductors 1000-1128 are made operational in a predetermined on/off pattern so that adjacent inductors are not operational at the same time. In the exemplary embodiment of FIG. 6, every $32^{nd}$ inductor in the inductors 1000-1128 is made operational at a given time, such as for example first making inductors 1000, 1032, 1064, and 1096 operational and then powered down before moving to a different set of inductors, such as to inductor 1031, 1063, 1095 and 1128, and repeating the process until all the inductors 1000-1128 have been made operational at one point in the foregoing pattern. By applying the forgoing pattern in rapid succession to each inductor set in the inductors 1000-1128, a virtual line scan of the affected inductors is obtained while minimizing the risk of detrimental overlapping of induction fields of adjacent inductors.

As shown in FIG. 6, in an exemplary implementation of the above-described pattern, a set of latches 300-307 are used for regulating the application of operating power to the inductors 1000-1128. In the exemplary embodiment shown in FIG. 6, latches 300-307 are 16 bit latches, each controlling a subset of sixteen inductors. A set of multiplexers 300a-307a adapted to receive a subset of sixteen of transmission lines 1000b-1128b are also used to reduce the total number of transmission lines exiting the inductor array subsystem 11, since at any give time only a subset of the inductors 1000-1128 are made operational and thus only a corresponding subset of the transmission lines 1000b-1128b are in use. As also shown in FIG. 6, each of latches 300-307 is paired to a respective one of multiplexers 300a-307a, via a respective one of control lines 300b-307b such that for example when latch 300 is instructed by control line 300b to provide operating power to inductor 1000, the multiplexer 300a is also instructed by control line 300b to select transmission line 1000b so to output the signal received from inductor 1000.

Figure 7:
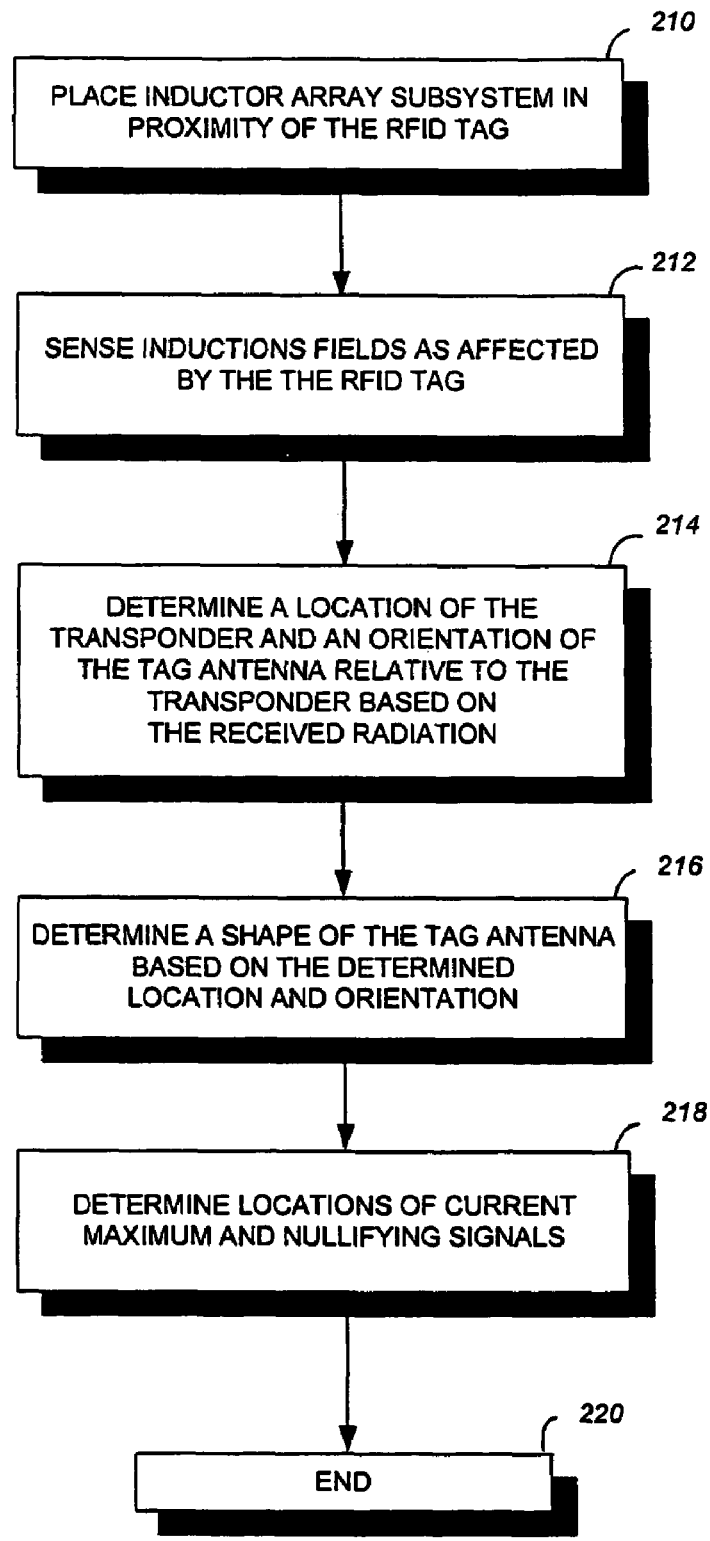
FIG. 7 is a flow diagram illustrating a method of imaging an RFID tag in accordance with an embodiment of the invention.

Operation of imager subsystem 50 may be better understood with reference to the flowchart of FIG. 7. As shown in FIG. 7, the process begins in block 210 where the inductor array subsystem 51 is placed in proximity of the RFID tag 2, such at a distance above the RFID tag 2. Next, in block 212, the inductions fields as affected by the metal within the RFID tag 2 are sensed. Next, in block 214, a location of the transponder 12 and an orientation 15 of the tag antenna 14 relative to the transponder 12 is determined by the microprocessor 29 based on the data received from the imager 11 such as respective outputs 300c-307c of multiplexers 300a-307a comprising signals representing the change in the frequency pattern of affected inductors 1000-1128. In an exemplary embodiment of the present invention, the orientation of the tag antenna 14 relative to the transponder 12 is determined based on a set of predetermined axes, such as in respect to predetermined assembly-line representations of x-axis and y-axis in a Cartesian coordinate system. Next, in block 216, a shape of the tag antenna 14 is determined based on the location of the transponder 12 and orientation of the tag antenna 14 relative to the transponder 12, as previously determined in block 214.

The flow then proceeds to block 218, in which based on the shape of the RFID tag 2 determined in block 216, the locations of current maximums, such as corresponding to plates 70a and 70b in FIGS. 2A and 2B, are determined using electromagnetic modeling. In addition, the phase and amplitude relationship for the nullifying signals B and B* are also determined as well as the corresponding locations 92 where the nullifying signals should be applied are determined in block 218. It will be appreciated that processor 29 may store the electromagnetic models of expected RFID tags. Based upon the imaging data provided by imager subsystem 50, processor 29 then merely needs to recall the electromagnetic data for the recognized RFID tag 2 in order to perform the operations described in block 218. The flow then proceeds to block 220 in which the overall process ends.

It will be appreciated that system 1 may also image and encode RFID tags using patch antennas rather than dipoles. It should be noted that the various features of the foregoing embodiments were discussed separately for clarity of description only and they can be incorporated in whole or in part into a single embodiment of the invention having all or some of these features.

What is claimed is:

1. A system for communicating with an RFID tag, the system comprising:
   a capacitive encoder adapted for placement in proximity of the RFID tag and operable to transmit a first operating signal to the RFID tag for communicating with the RFID tag; wherein the capacitive encoder is further operable to transmit to the RFID tag a second operating signal adapted to excite the RFID tag such that RF radiations from the RFID tag to adjacent RFID tags are nullified.

2. The system as defined in claim 1, wherein the RFID tag comprises a tag antenna.

3. The system as defined in claim 2, wherein the RFID tag further comprises a transponder and wherein the first operating signal excites the transponder.

4. The system as defined in claim 1, further comprising:
   a first conductive element; and
   a second conductive element; wherein the first operating signal comprises a first RF signal driven on the first conductive element and a second RF signal driven on the second conductive element, wherein the second RF signal is out of phase with the first RF signal by a predetermined phase.

5. The system as defined in claim 4, further comprising:
   a third conductive element; and
   a fourth conductive element, wherein the second operating signal comprises a third RF signal driven on the third conductive element and a fourth RF signal driven on the fourth conductive element.

6. The system as defined in claim 5, further comprising:
   a first programmable attenuator;
   a second programmable attenuator;
   a first programmable phase shifter;
   a second programmable phase shifter, wherein the capacitive encoder controls the first programmable attenuator and phase shifter to attenuate and phase shift an RF source to provide the third RF signal, and wherein the capacitive encoder controls the second programmable attenuator and phase shifter to attenuate and phase shift the RF source to provide the fourth RF signal.

7. The system as defined in claim 6, further comprising:
   a third programmable phase shifter, wherein the capacitive encoder controls the third programmable phase shifter to phase shift the RF source by the predetermined phase to provide the second RF signal.

8. The system as defined in claim 6, further comprising:
   a dielectric substrate, wherein the first, second, third, and fourth conductive elements each comprise a metallic patch on a surface of the dielectric substrate; and a bus structure formed within the dielectric substrate and adapted to carry the first, second, third, and fourth RF signals to each of the metallic patches.

9. The system as defined in claim 8, further comprising:
a plurality of metallic patches formed on the surface of the dielectric substrate, wherein the capacitive encoder is operable to select the first, second, third, and fourth metallic patches from the plurality of metallic patches.

10. A method for communicating with an RFID tag, the method comprising:
placing a capacitive encoder in proximity of the RFID tag;
transmitting a first operating signal from the capacitive encoder to the RFID tag for communicating with the RFID tag; and
during the transmission of the first operating signal, transmitting to the RFID tag a second operating signal from the capacitive encoder such that RF transmission from the RFID tag to adjacent RFID tags is nullified.

11. The method as defined in claim 10, wherein the RFID tag comprises a tag antenna.

12. The method as defined in claim 10, wherein the RFID tag further comprises a transponder and wherein the first operating signal excites the transponder.

13. The method as defined in claim 10, wherein transmitting a first operating signal from the capacitive encoder comprises transmitting a first RF signal from a first conductive element and transmitting a second RF signal from a second conductive element, wherein the second RF signal is out of phase from the first RF signal by a predetermined phase.

14. The method as defined in claim 13, further comprising:
modeling an antenna of the RFID tag to determine at least one nullifying phase shift and at least one nullifying attenuation;
phase shifting and attenuating an RF source according to the at least one nullifying phase shift and attenuation to provide a third and a fourth RF signal, wherein transmitting to the RFID tag a second operating signal comprises transmitting the third RF signal from a third conductive element and transmitting the fourth RF signal from the fourth conductive element.

* * * * *